United States Patent [19]

Steinbruchel

[11] 3,849,259

[45] Nov. 19, 1974

[54] DISTILLATION APPARATUS

[75] Inventor: Armando B. Steinbruchel, San Diego, Calif.

[73] Assignee: Aqua-Chem, Inc., Milwaukee, Wis.

[22] Filed: Sept. 27, 1973

[21] Appl. No.: 401,183

Related U.S. Application Data

[63] Continuation of Ser. No. 186,178, Oct. 4, 1971, abandoned.

[52] U.S. Cl............... 202/174, 159/18, 159/DIG. 8
[51] Int. Cl........................... B01d 1/26, B01d 3/02
[58] Field of Search ... 159/2 MS, 13 A, 13 B, 17 R, 159/17 C, 17 VS, 18, 28 R, 28 VH, DIG. 8; 203/10, 11; 202/173, 174, 185, 185 B

[56] References Cited
UNITED STATES PATENTS

| | | | |
|---|---|---|---|
| 1,028,738 | 6/1012 | Kestner................................. | 159/14 |
| 1,200,996 | 10/1916 | Soderlund & Boberg............ | 159/24 |
| 2,703,610 | 3/1955 | Cross.................................. | 159/17 P |
| 3,303,106 | 2/1967 | Standiford, Jr. ...................... | 159/18 |
| 3,351,120 | 11/1967 | Goeldner............................ | 159/13 B |
| 3,481,835 | 12/1969 | Carnavos............................ | 202/174 |
| 3,487,873 | 1/1970 | Bromley et al. ...................... | 159/13 |

*Primary Examiner*—Jack Sofer
*Attorney, Agent, or Firm*—Fred Wiviott; Ralph G. Hohenfeldt

[57] ABSTRACT

A thin film evaporator having a plurality of effects arranged in a vertical array and connected in a series relationship. A portion of the liquid fed over heat exchange tubes as a thin film is vaporized to condense vapor passed therethrough. The unevaporated feed liquid is passed through successive effects and the vapor generated in each effect is employed as the heating vapor for the next effect. The heat exchange tubes of at least one of the initial effects is arranged generally vertically and those in the balance of the effects are arranged generally horizontally and extend radially with their outlet ends facing condensate collecting chambers disposed within a central core. Feed water preheaters extend vertically through a plurality of collecting chambers with a feed liquid take-off for each phase.

37 Claims, 8 Drawing Figures

POLYPHOSPHATE TREATED FEEDWATER — — — — —
ACID TREATED FEEDWATER — · — · — · —

INVENTOR
ARMANDO B. STEINBRUCHEL

BY
*Winnott & Hohenfeldt*
ATTORNEY

INVENTOR
ARMANDO B. STEINBRUCHEL

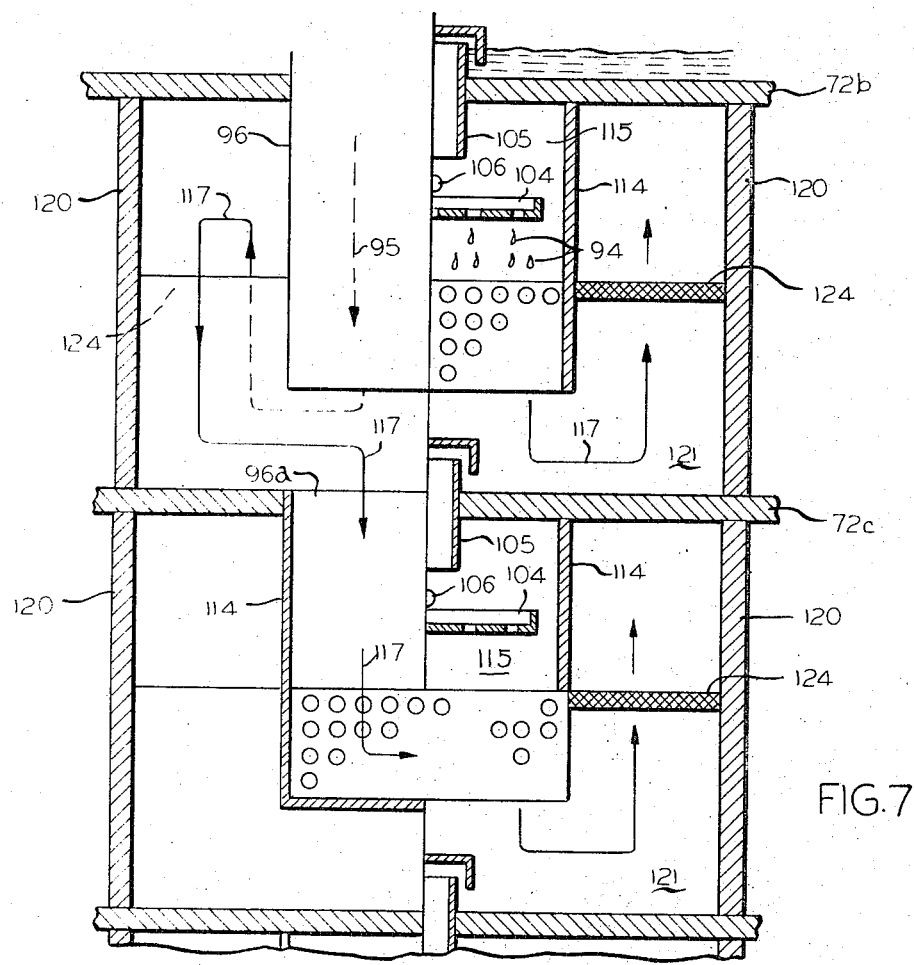
FIG.7
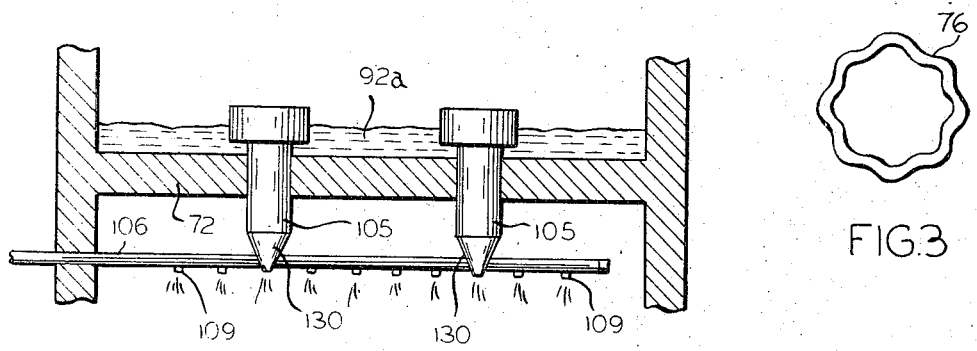
FIG.8
FIG.3
INVENTOR
ARMANDO B. STEINBRUCHEL
BY Winnett & Hohenfeldt
ATTORNEY

INVENTOR
ARMANDO B. STEINBRUCHEL

BY Winiott Hohenfeldt
ATTORNEY

DISTILLATION APPARATUS

This is a continuation of application Ser. No. 186,178, filed Oct. 4, 1971, now abandoned.

BACKGROUND OF THE INVENTION

This invention relates to the distillation of liquids and more specifically to multieffect, thin film evaporators having particular, but not exclusive, application to the desalination of sea water.

There are a variety of methods and apparatus which have been employed for the purpose of rendering brackish or salt water potable. Certain of these prior art distillation apparatus were not wholly satisfactory, however, because of their relatively limited capacity. Other types of apparatus capable of handling large quantities of water here inherently inefficient so that production costs were disproportionally higher than with conventional water sources.

The type of distillation apparatus to which the present invention relates is a thin film evaporator having a plurality of effects. Each effect includes heat exchange tubes through which vapor is passed while the feed liquid is distributed as a thin film over their outer surfaces. A first portion of the vapor condenses within the tubes and a second portion condenses on feed water preheaters. The condensate is collected as the product distillate of the system. The heat released upon the condensation of the vapor within the heat exchange tubes evaporates a portion of the feed liquid which becomes the vapor for the next succeeding phase and the unevaporated portion is collected as the succeeding effect feed liquid.

SUMMARY OF THE INVENTION

It is an object of the invention to provide a new and improved multieffect thin film evaporator.

A further object of the invention is to provide a distillation apparatus whose heat exchange tubes and feed liquid preheaters are arranged for optimum heat transfer.

Another object of the invention is to provide a distillation apparatus capable of providing potable water at a relatively low cost.

Still another object of the invention is to provide a multieffect thin film evaporator whose evaporator bundles are arranged to provide a greater volume at the steam end of the heat tube bundles without an inordinate increase in the overall structure.

A still further object of the invention is to provide an evaporator arranged such that a plurality of heat tube bundles in each effect are positioned to act on the same feed liquid preheaters.

Yet another object of the invention is to provide a multieffect thin film evaporator having feed liquid preheaters wherein the pumping requirements are minimized.

A further object of the invention is to provide a multieffect thin film evaporator wherein the feed liquid is provided in each effect at a rate substantially equal to that evaporated in the preceding effect.

Certain objects of the invention are achieved by a multiple effect thin film evaporator wherein the heat exchange tube bundle of at least one of the effects is arranged vertically and the heat exchange tubes of the remaining effects are arranged horizontally. Other objects are accomplished by arranging the horizontally disposed heat tube bundles radially about and with their outlet ends adjacent feed liquid preheaters. Further objects are attained by providing feed liquid preheaters which extend uninterrupted through a plurality of effects and from which feed liquid is withdrawn at each effect in an amount substantially equal to that evaporated in the previous effect. Still further objects are achieved by providing separate preheaters for various effects or groups of effects.

The accomplishment of other objects of the invention will become apparent from the detailed description of the invention taken with the accompanying drawings.

BRIEF DESCRIPTION OF THE DRAWINGS

FIG. 3 is a sectional view of certain of the heat exchange tubes of the apparatus of FIG. 2;

FIG. 7 is a fragmentary view of the distillation apparatus showing the vapor path between effects; and FIG. 8 is a fragmentary view of an alternate imbodiment of a portion of the feed water distribution system.

DETAILED DESCRIPTION OF THE PREFERRED EMBODIMENTS

Figure 1:
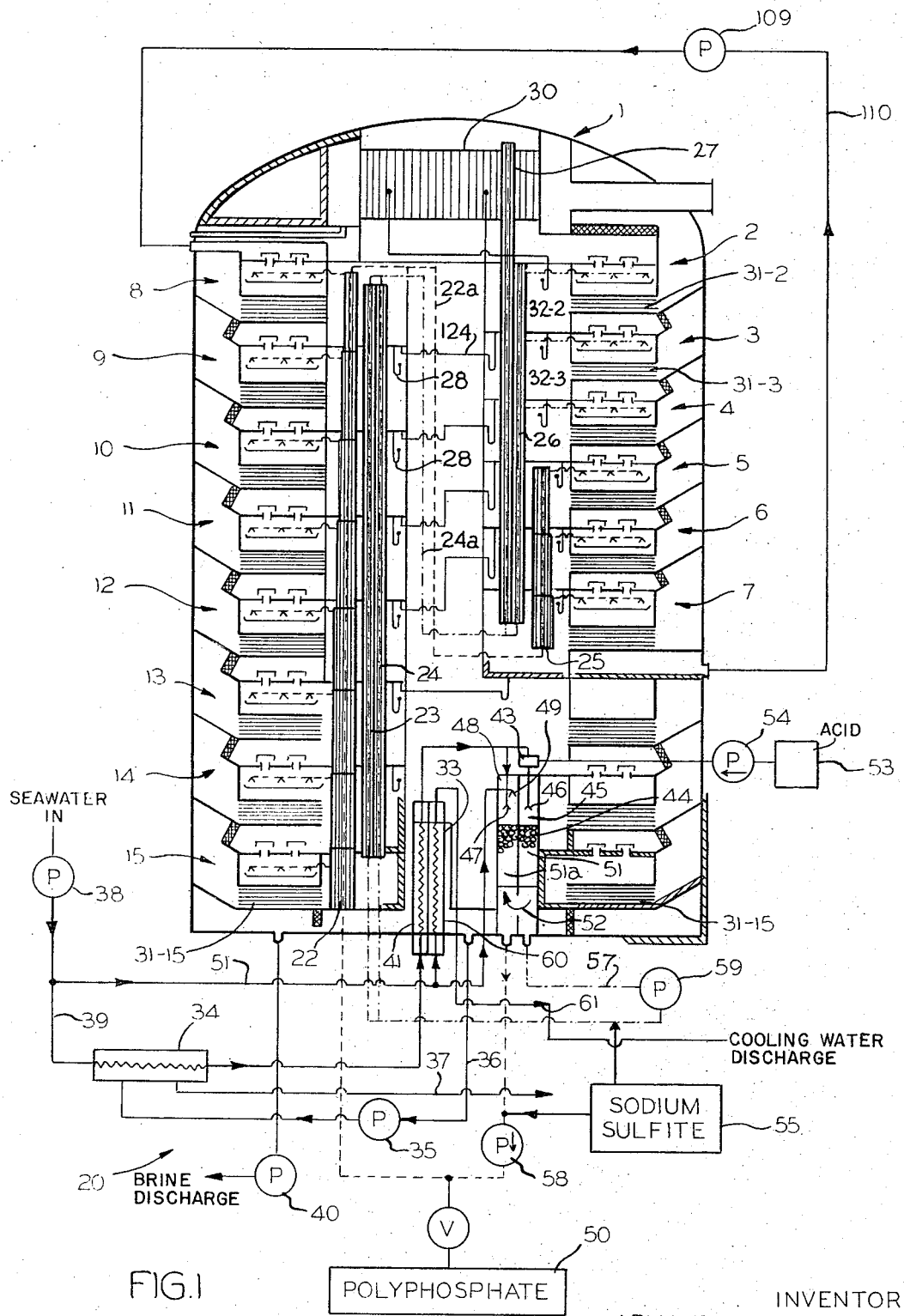
FIG. 1 schematically illustrates the distillation apparatus embodying the present invention.

FIG. 1 schematically illustrates a multieffect distillation apparatus which will be discussed in relation to the distillation of sea water, although the inventive concept may also be employed for the distillation of other liquids as well. Those skilled in the art will also appreciate that the number of effects may vary with requirements and the design parameters of the system. The illustrative embodiments, by way of example, is shown to have fifteen effects numbered 1–15.

When the system is employed for the distillation of sea water, the latter initially passes through a heat reject on and chemical treatment system 20 where it is preheated, receives chemical pretreatment, is deaerated and degassed. The water is then passed through a preheater consisting of preheater tube bundles 22, 23, 24, 25, 26 and 27 which are constructed and arranged such that the sea water feed for each effect passes successively through the vapor collection portion of each preceding effect where it is preheated by a portion of the vapors condensed in each such effect. At each effect, also, part of the preheated sea water feed is added to the unevaporated brine feed entering from the preceding effect to compensate for water evaporated in the preceding effect and thereby maintain the liquid flow rate necessary to assure a totally wetted surface on the evaporator tubes.

As will be discussed more fully hereinbelow, effect 1 preferably includes a vertically disposed heat exchange tube bundle 30 while effects 2–15 may have horizontally disposed heat exchange tube bundles identified respectively by reference numerals 31-2 to 31-15.

Figure 2:
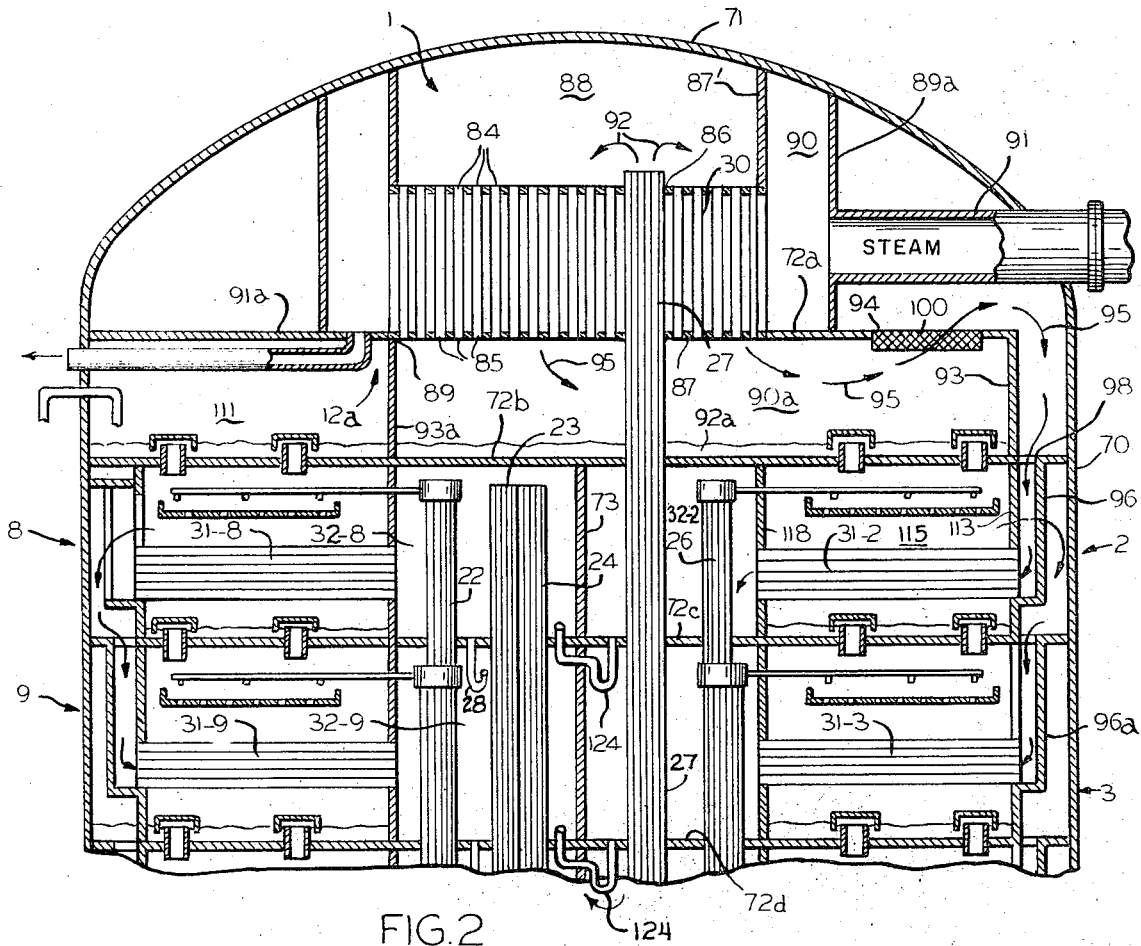
FIG. 2 is a sectional view of a portion of the distillation according to a preferred embodiment of the invention.

Effect 1 may receive saturated steam at a suitable temperature, such as 247°F, for example, from any available source, such as a boiler or steam generator. The final portion of the feed water remaining after passage through the first 14 stages in the preheaters 26 and 27 wil be raised to an elevated temperature, such as approximately 229°F, in the illustrated example. A portion of the steam is employed to elevate this feed water portion to approximately 240°F in the last portion of preheater 27. The major portion of the steam provided to effect 1 condenses on the exterior of the heat exchange tubes 30 to evaporate a portion of the feed water passing as a thin film through the interior of said tubes. This evaporator feed water or vapor is conducted to the interior of the tubes 31-2 of effect 2 as shown in FIG. 2, and the unevaporated portion of the feed water is combined with a slip steam of feed water from the preheater 26 and then distributed evenly over the outside of tubes 31-2. A portion of the total vapor passing to effect 2 is condensed within the tubes 31-2 and the remaining vapor is condensed on the outside surface of preheater tubes 26 and 27 within the second effect distillate collecting chamber 32-2.

The distillate collected in effect 2 may then be delivered by pipe 124 to the distillate chamber to one of the lower pressure effects, such as chamber 32-8 where a lower pressure causes a portion of the distillate to be converted to vapor by flashing thereby cooling the unvaporized portion. This flashed vapor may be combined with the uncondensed vapor from heat exchange tubes 31-8 of effect 8 for condensation on the preheater tubes 22, 23 and 24. Similarly, the condensate from effect 8 is further flashed down through the remaining effects by pipes 28. It may also be desirable to conduct the flashed vapors (of effect 8, for example) to the inlet end of the heat exchange tubes of the next lower effect (effect 9) to aid in the removal of noncondensables.

The distillation procedure just discussed is repeated in each evaporation effect. In effect 15, the vapor is condensed in the final condenser 33 which heats the incoming sea water make-up stream. The condensate from effect 15 is added to the product water produced in the other effects and is then passed by pump 35 and conduits 36 and 37 through the distillate cooler 34 which also acts as a preheater for the incoming sea water. The brine from effect 15 is passed by pump 40 back into the sea and the condensate from effect 1 is returned to the generator steam system.

Referring again to the intake system 20, sea water is introduced into the system by a sea water pump 38 a first portion of whose output is passed by a conduit 39 through the distillate cooler 34 where it extracts heat from the evaporator distillate. The warmed sea water is then passed through a first portion 41 of final condenser 33 after which it is split into two streams. One stream passes through a mixer 43 where it is blended with a suitable acid solution, such as sulphuric acid of known concentration from an acid storage vessel 53 via pump 54. The acid treated stream is then sprayed into a first chamber 45 of a deaerator 44 through a nozzle 46 fabricated of a suitable corrosion resistant material, such as stainless steel. The second preheated sea water stream is injected by a similar nozzle 47 into a second chamber 48 of the deaerator 44 and after exiting therefrom is treated with polyphosphate from a container 50.

Polyphosphate treatment is effective for controlling scale formation at operating temperatures below 195°F by depressing the reaction which forms $CaCO_3$ scale thereby avoiding its deposit on the heat exchange tubes within the system. This treatment is used in the feed system for effects 5-15, which operate up to approximately this temperature. As will be described more fully below with reference to FIG. 1, the acid treated feed water is employed in stages 1-4 and is effective to control scale formation and maintain acceptable heat transfer performance through the heat exchange tubes at operating temperatures above 195°F. It has been found that this dual water treatment system, rather than acid treatment of the feed stream to all effects, substantially reduces the operating costs of the system.

The deaerator 44 is of the vacuum, packed column type, consisting of separate sections 45 and 48 having packing beds 51 and 51a, respectively. As indicated above, feed water streams, which have been partially heated in the distillate cooler 34 and final condenser 33 are introduced into sections 45 and 48 through spray nozzles 46 and 47, respectively. In addition, unheated sea water is sprayed into chamber 48 through nozzle 49 and conduit 50 so that flashing of both make-up streams occurs since this cold water spray maintains the vapor pressure in the deaerator 44 at approximately 2°F lower than the temperature of the feed water streams entering it. The flashed vapors from the acidified sea water make-up steam flow with the liquid through the deaerator bed 51 where the flashed vapors then pass through an opening between the chambers into the phosphate section 48 as indicated by the arrow 52 and upward through the packing bed 51a. This upward passage of vapor tends to scrub the feed stream entering at nozzle 47 as it flows downward through the deaerator packing 51a to enhance the removal of dissolved gasses.

The deaerated sea water collected in the lower portion of the chamber 48 receives the polyphosphate treatment while being fed by pump 58 to the heat exchanger 22 where portions are drawn off at effects 15-8 and the remainder delivered through pipe 22a to the lower end of heat exchanger 25. The acid treated deaerated sea water from chamber 45 is fed through pipe 57 by pump 59 to each of the feed water preheaters 23 and 24. Feed water preheaters 23 and 24 pass upwardly through effects 15 to 8 and their upper ends are connected by pipe 23a to the lower end of preheaters 26 and 27 for the passage of feed water through effects 7 to 5 prior to use in effects 4 to 1.

During the acidification of the sea water, a quantity of $CO_2$ is evolved. This gas as well as air dissolved in the incoming sea water is substantially removed in the deaerator 44 by a vacuum system (not shown). The removal of these gases minimizes corrosion in the evaporator and limits the amount of noncondensable gases which could impair and reduce the effectiveness of the heat transfer portions of the apparatus. In addition, sodium sulphite may also be introduced into the acid and phosphate treated feed water streams from container 55 to remove any remaining dissolved oxygen. Means not shown, but which are well known in the art, will be provided at each effect for venting such noncondensables as may appear in the system.

In addition to the heated sea water which is provided to the deaerator 44, a second portion is provided as a cooling medium to the section 60 of the final condenser 33 and is then discharged through conduit 61.

Referring now to FIG. 2, the distilling apparatus according to the preferred embodiment of the present invention is shown to be disposed within a cylindrical outer metallic shell 70 having a closure dome 71 at its upper end which may have a spherical shape for greater strength. The entire assembly may be mounted upon a suitable base, such as a concrete slab (not shown). As those skilled in the art will appreciate, the shell 70 may be suitably stiffened by structural members (not shown). The outer surface of the shell may also be covered with insulation to reduce heat loss and lower the thermal gradient. A plurality of horizontal diaphragm walls 72a, 72b, 72c, etc. separate the effects vertically one from the other and a vertical diaphragm wall 73 separates effects 2-7 from effects 8-12. Wall 73 does not extend below effects 7 and 12 because effects 13, 14 and 15 each occupies an entire level of the vessel 70. It will be appreciated that the diaphragm walls may also be suitably reinforced with structural members (not shown). A cylindrical access shaft 75 (see FIGS. 5 and 6) may extend from the base to the floor of effect 1 and doubles as a structural column.

Referring again to FIG. 2, the feed water preheater bundles 22, 23, 24, 25, 26 and 27 are located in the center portion of the evaporator shell 70 and progressively pass through the condensate collecting chambers 32-15 to 32-2 of effects 15 to effect 2. Each preheater consists of bundles of vertically oriented tubes which may have the double fluted enhancement configuration such as tube 76 shown in FIG. 3. Some of the tubes of the preheaters 22-27 pass uninterrupted from one effect to the other in a sealing relation through the diaphragm walls 72 while others of said tubes terminate at each effect to permit partial withdrawal of feed water to the evaporator structure of that effect. As a result, the feed water stream flowing through the preheater tube bundles 22-26 becomes progressively smaller. The preheating bundles therefore, may also be reduced in size whereby bundle 22 is the smallest at effect 8, bundle 25 at effect 5 and bundle 26 at effect 2 (FIG. 1). Bundle 27, however, continues uninterrupted to effect 1. Water boxes 81 may be provided at each effect as the upper terminus of the heat exchange tubes at that effect or the respective heat exchange tubes may merely branch off.

Effect 1 is shown to include a vertically oriented tube bundle 30 which consists of individual tubes arranged in a circular array about preheater 27. The individual tubes of bundle 30 may be of the double fluted enhanced type as shown in FIG. 3 and are secured in a sealed relation in suitable openings 84 and 85 formed respectively in upper and lower tube sheets 86 and 87. A vertical annular wall 87' extending from the outer margin of upper tube sheet 86 to the dome 71 forms a feed water distribution chamber 88 above the tube bundle 30 for receiving feed water from the preheater 27. The lower tube sheet 87 is disposed in a circular opening 89 formed in diaphragm wall 72a which defines the upper margin of vapor separated chamber 90a.

A second annular wall 89a surrounds the tube bundle 30 and extends between the diaphragm wall 72a forming the lower margin of effect 1 and the dome 71 for defining the steam chamber 90 surrounding tube bundle 30. A first relatively large diameter pipe 91 extends through the dome 71 and terminates in a sealing relation at the wall 89a for coupling the chamber 90 to a suitable source of steam, such as the steam system of a steam turbine. A second pipe 90a is coupled to the lower end of chamber 90 for conducting condensate back to the steam source.

In operation of effect 1, the warmed feed water represented by arrow 92 is conducted through preheater 27 to the distribution chamber 88 and then passes downwardly as a thin film through the interior of the tubes of bundle 30. Steam is delivered from pipe 91 to bundle 30 in the radial direction to evaporate a portion of the feed water 92 falling through the interior of tubes 30 and to preheat a portion of the feed water flowing upwardly through preheater bundle 27. The heating system condenses in chamber 90 and is returned to the steam supply system through pipe 91a. The latent heat of vaporization, liberated by the condensation of the steam, vaporizes a portion of feed water 92 passing downwardly through the tubes of bundle 30. This vapor generated in effect 1, and symbolized by arrows 95, passes into vapor separating chamber 90a disposed at the outlet side of tubes 30 and formed by diaphragm walls 72a and 72b and vertical walls 93 and 93a. The unevaporated portion of the feed water 92a collects on the floor of chamber 90a.

A passage for the vapor 95 from the chamber 90a of effect 1 to the horizontal heat exchange tubes 31-2 of effect 2 is formed by an opening 94 in wall 72a, the space between the wall 93 and the shell 70 and a chute 96 extending downwardly between an aperture 98 formed in diaphragm wall 72b and the entrance end of heat exchange tubes 31-2. A demister element 100 is disposed in opening 94 to remove entrained droplets of brine from the vapor passing through it.

Figure 4:
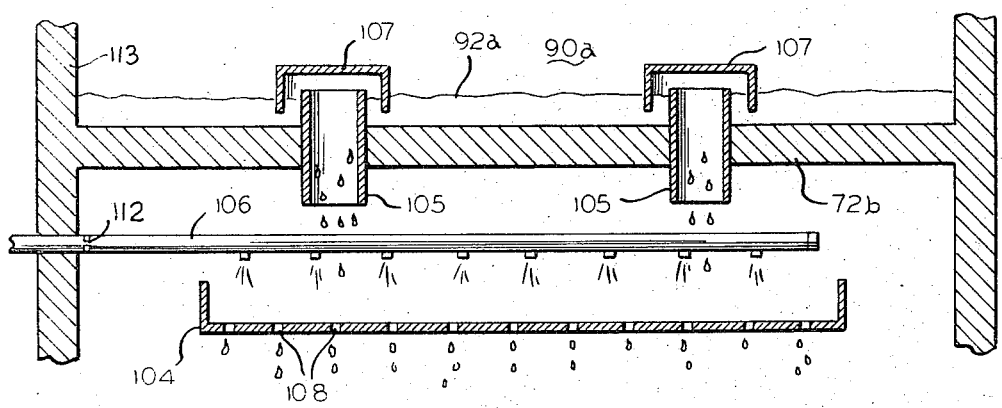
FIG. 4 is a fragmentary view of a portion of the distillation apparatus feed liquid distribution system.

In the feed water system of the preferred embodiment of the present invention, each evaporator effect is supplied with brine from the previous effect and a portion of newly treated, but unconcentrated, feed water. As illustrated in FIG. 4 with respect to effect 2, feed water mixing is performed in a distributing tray 104 suitably supported above its respective tube bundle. The concentrated brine 92a is supplied to the tray 104 from chamber 90a by means of a pair of overflow pipes 105 which extend vertically through diaphragm wall 72b and above tray 104. The feed water is flash cooled to the boiling temperature of effect 2 as it passes through pipes 105.

The overflow pipes 105 extend above the wall 72b and are covered by vapor caps 107 which are spaced from the upper ends of pipes 105. The lower ends of caps 107 extend downwardly below the upper ends of pipes 105 and below the surface of feed water 92a to provide a vapor seal between effects. The pipes 105 also serve to eliminate the draw-off of liquid from the floor of effect 1 and allows solids, such as corrosion products, to settle out.

Unconcentrated feed water is provided to distributing tray 104 by means of feed water 106 which extends from the water box 81 associated with effect 2. Pipe 106 may have a plurality of small nozzles 109 distributed longitudinally and oriented downwardly. The distributing tray 104 is provided with a plurality of small apertures 108 which evenly distributes the feed water over the evaporator tubes. An orifice 112 within the pipe 106 controls the flow of feed water such that a thin film of liquid is maintained on the outer surface of the tubes without exceeding the wetting requirements. In addition, feed water injected through pipe 106 will be approximately equal that evaporated in effect 1 and compensate for the increase in tube surface area between effects 1 and 2 and thereby effectively wetting the tubes in successive effects. It will be appreciated that a similar feed water tray 104 and pipe 106 are associated with each heat exchange tube bundle 31 of each effect.

The unevaporated feed water from each effect is similarly conducted to the succeeding effect and mixed with unconcentrated feed water. As the feed water proceeds through the various effects of the system, it becomes more concentrated as its component water is evaporated in the various effects. The brine collects at the bottom of effect 7 and is then pumped by a brine transfer pump 109 (see FIG. 1) through a pipe 110 and into a feed water chamber 111 disposed above effect 8. The cascading of the feed water continues through effects 8-15 with the unevaporated brine collected in effect 15 being discharged via pump 40.

As indicated hereinabove, as the feed water 92a rains downwardly from the distributor tray 104 and onto the heat exchange tubes 31-2 in effect 2 (see FIG. 1), a portion of the steam within the tubes condenses and collects within the distillate chamber 32-2 at the outlet end of said tube bundle. The remaining portion of the vapor is condensed on the outside surface of the preheater tubes 26 and 27 disposed within chamber 32-2.

In the example of the preferred embodiment of the invention, when 247°F steam is employed, the feed water in preheater 27 will be raised to a temperature of about 229°F in the fourteen preceding effects and to about 240°F by the steam in stage 1. The vapor and feed water passing from effect 1 to effect 2 is at approximately 240°F and this feed water is mixed with water at approximately 229°F from preheater 26. Similarly, the water and vapor exiting from stage 2 is at 229°F and this water is mixed with 217°F water in effect 2. The temperature of each succeeding effect is lower with the unevaporated brine in effect 15 being at approximately 105°F.

It has been found that at temperatures in excess of approximately 225°F, vertically disposed heat exchange tubes provide greater heat transfer effectiveness per unit cost then horizontally disposed tubes. Conversely, below about 225°F, horizontally disposed tubes have greater heat transfer effectiveness per unit cost. The preferred embodiment of the invention takes advantage of this relationship by vertically orienting the heat exchange tubes 30 of effect 1, which operate above 225°F. On the other hand, the heat exchange tubes 31-2 to 31-15 of the remaining effects are disposed horizontally. It will be appreciated that if the system is operated at higher temperatures, additional effects may also be vertically arranged.

Figure 5:
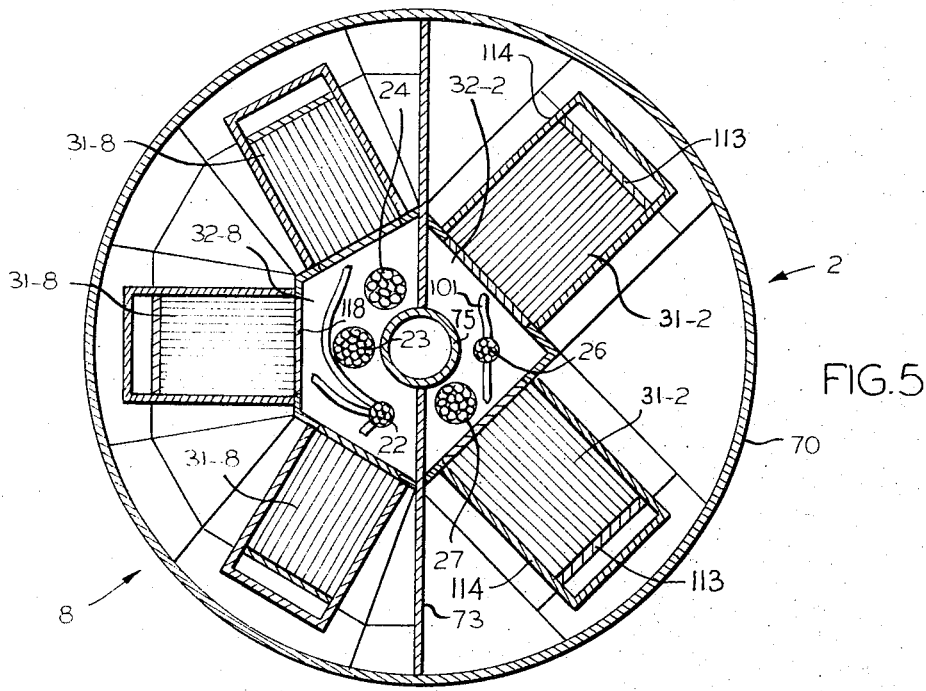
FIGS. 5 and 6 are horizontal sections of the distillation apparatus according to the present invention and illustrating the arrangement of the heat exchange tube bundles at various effects.
Figure 6:
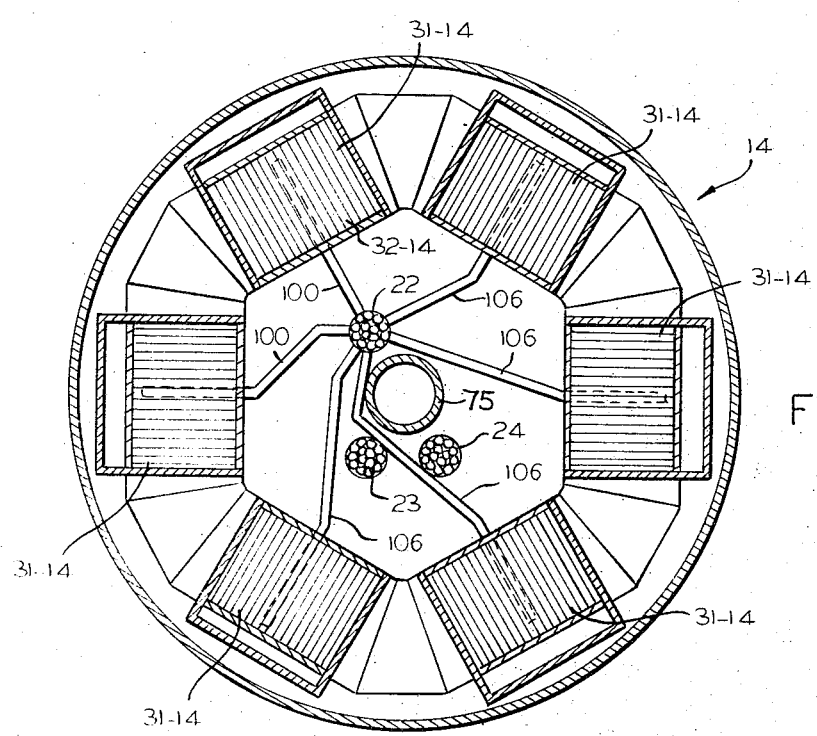

Referring now to FIGS. 5 and 6, each effect is shown to include a plurality of heat exchange tube bundles. For example, effect 2 is shown in FIG. 5 to include two bundles 31-2, effect 8 is shown to include three bundles 31-8 and effect 14 is shown in FIG. 6 to include six bundles, 31-14. It will be appreciated that successive stages will operate at successively lower temperatures and pressures. It is desirable to increase the number of tube bundles in this fashion so as to increase the space for the release of vapors in the lower temperature and pressure stages. This is facilitated by the circular array of heat tube bundles at the various levels wherein the horizontal bundles of effects 2-15 extend radially relative to the axis of shell 70. This orientation of heat tube bundles allows all of the heat tube bundles to discharge vapor directly on the preheater tubes 22, 23, 24, 25, 26 and 27 disposed within the respective condensate chambers 32. Further, the radial array of heat tube bundles according to the present invention accommodates a reduction in volume of the heating vapors as it flows from the inlet ends of the bundles to the outlet which open into the respective condensate chambers 32 at the center of the array.

The feed water and vapor separating chambers associated with each of the horizontal heat tube bundles of effects 2-15 are substantially identical and, accordingly, only that associated with one of the tube bundles of effect 2 will be discussed for the sake of brevity. As seen in FIGS. 2, 5 and 7, a vertical front wall 113 and partial side wall 114 respectively separate the feed water chamber 115 from the vapor symbolized by arrow 95 entering from effect 1 and the vapor symbolized by arrow 117 exiting to effect 2. In additon, a back wall 118 separates the feed water chamber from the condensate collecting chamber 32-2. A second pair of side walls 120 are spaced from the heat tube bundle 31-2 and extend vertically between diaphragm walls 72b and 72c. In addition, a pair of demister elements 124 extend along the sides of the tube bundle 31-2 and between the lower ends of each of the walls 114 and the side walls 120. These demister elements 124 may be of any conventional type well known in the art such as the monel wire mesh type or hook and vane separators.

As the feed water 92a rains downwardly from the distribution tray 104 onto the tube bundle 31-2, a portion is vaporized while the remainder collects in the vapor separating space 121 below the tube bundle. The vapor 117 travels outwardly from the heat tube bundle 31-2 toward the side walls 120 and then upwardly through the demister elements 124 and then forwardly and around the chute 96 before passing into the upper end of chute 96a of effect 2.

Referring again to FIG. 2, a pipe 124 may be provided to conduct the distillate collected in chamber 32-2 of effect 2 to the distillate chamber 32-8 of effect 8, where a portion is converted to vapor by flashing and then condenses on the heat exchange tubes 22, 23 and 24 for combination with the product water from that effect. The condensate collected in effect 8 is, in turn, further flashed down successively in effects through pipes 28. Similar pipes, such as pipe 125 which couple distillate collecting chambers 32-3 to 32-9, transfer distillate from effects 3-7 to effects 9-13 respectively.

The vertically arranged feed water preheater tube assemblies 22-27, which carry feed water to each effect, extend uninterruptedly through all lower temperature effects to provide efficient and economical means of preheating the feed water and require less pumping force than conventional preheater assemblies employed in multieffect systems of this type. In addition, this configuration requires less room than horizontally arranged preheater assemblies and accordingly permit smaller overall shell dimensions. Further, this arrangement of the preheater assemblies at the core of the structure along with the radial orientation of the horizontal heat exchange tube bundles, allows a plurality of such bundles in a single effect to discharge vapor to all of the preheater tubes passing through such effect. Also, this orientation of the preheater tubes 22–27 permits a dual acid and phosphate feed water treatment system.

FIG. 8 shows an alternate embodiment of the feedwater distribution system wherein each of the pipes 105 is provided with a suitable spray nozzle 130 at its lower end. The pressure difference between effects, which varies downwardly with temperature from about 5psi between effects 1 and 2 to about 0.5psi between effects 14 and 15, forces the feed water 95 through nozzle 130 from which it emerges as a fine spray. The spray of feed water from the previous effect exiting from nozzles 130 mixes with the spray of additional feed water from nozzles 109 of pipe 106. In this manner, mixing of the feed water above the heat exchange tube bundles of each effect is accomplished without the distribution tray 104. This spray from nozzles 109 and 130 is effective to provide a thin film of feed water on the individual tubes of the heat exchange tube bundles.

While the invention has been disclosed with respect to a particular distilling apparatus and further while only a single embodiment of the invention has been shown and described, it is not intended to be limited thereby but only by the scope of the appended claims.

I claim:

1. An evaporator including a plurality of successive effects, each effect operating at a lower temperature than preceding effects,
    each effect including heat exchange tube means for placing a feed liquid and vapor in a heat exchange relation so that at least a portion of said feed liquid is vaporized and at least a portion of said vapor is condensed,
    vapor distribution means for feeding at least a part of the vaporized portion of the feed liquid generated in each effect except the lowest temperature effect, as the vapor to the heat exchange tube means of the next lower temperature effect,
    the heat exchange tube means of the initial one of said successive effects being oriented with its individual heat exchange tubes disposed substantially vertically and the heat exchange tube means of the remaining effects being oriented with their individual heat exchange tube means disposed substantially horizontally,
    feed liquid distribution means for feeding an initial quantity of feed liquid to the interiors of the heat exchange tubes of the initial effect and for feeding the unevaporated portion of said feed liquid from each effect as a film over the outer surfaces of said horizontally disposed heat exchange tubes of the next succeeding effect, said vapor distribution means conducting said vapor to the interiors of said horizontally disposed tubes of the next lower temperature effect, said feed liquid means also including means for providing an additional quantity of feed liquid to each of said horizontally disposed heat exchange tubes in an amount substantially sufficient to maintain a thin film on the outer surfaces thereof.

2. The evaporator set forth in claim 1 wherein, the heat exchange tube means of each of said remaining effects comprises a plurality of heat exchange tube bundle means, and each of said heat exchange tube bundle means has a vapor entrance end and a vapor exit end and is disposed in a generally radial direction relative to the vertical axis of said evaporator, each of said exit ends facing said axis.

3. The evaporator set forth in claim 2, wherein the heat exchange tubes of said initial one of said effects form a bundle and are arranged vertically with respect to said axis and feed liquid preheater means extending vertically through said initial bundle in parallelism with said heat exchange tubes for conducting feed liquid to the upper ends of said heat exchange tubes for passage downwardly along the surfaces thereof and means for conducting vapor against the other surfaces thereof.

4. The evaporator of claim 3, wherein said successive effects are arranged one below the other and said preheater means is disposed vertically and passes uninterruptedly through at least a pair of adjacent effects.

5. The evaporator set forth in claim 4, wherein said feed liquid preheater means is disposed generally vertically and passes uninterruptedly through at least a plurality of said remaining effects and is disposed adjacent the exit ends of the heat exchange tube means of said remaining effects for condensing the unevaporated portion of said vapor.

6. The evaporator set forth in claim 5, wherein the size of said feed water preheater means in horizontal cross section is successively smaller in each higher temperature effect in relation to said additional quantity of feed liquid.

7. The evaporator set forth in claim 6 and including housing means surrounding said effects,
    and diaphragm wall means extending substantially horizontally between said effects to provide a liquid and vapor barrier therebetween.

8. The evaporator set forth in claim 7, wherein said housing is substantially cylindrical,
    a vertical diaphragm wall extending diagonally across said housing, a first group of said plurality of successive effects being disposed in vertical array on one side of said wall and a second group of said plurality of successive effects being disposed in vertical array on the other side thereof, the effects of each group being arranged one below the other in order of decreasing boiling pressure from top to bottom.

9. An evaporator including a substantially cylindrical housing for enclosing an initial effect and a plurality of successive effects operating at successively lower temperatures,
    each effect including heat exchange tube means for placing a feed liquid and vapor in a heat exchange relation so that at least a portion of said feed liquid is vaporized and at least a portion of said vapor is condensed,
    feed liquid distribution means for feeding the unevaporated portion of said feed liquid from each effect to the heat exchange tube means of the next succeeding effect as film over the exterior surface of said tube means,
    vapor distribution means for feeding the vaporized portion of the feed liquid generated in each effect as the vapor to the interior of the heat exchange tube means of the next lower temperature effect,
    the heat exchange tube means of the initial one of said successive effects being oriented with its individual heat exchange tubes disposed substantially vertically and the heat exchange tube means of the remaining effects being oriented with their individual heat exchange tube means disposed substantially horizontally, the heat exchange tube means of each of said remaining effects comprises a plurality of heat exchange tube bundle means, each of said heat exchange tube bundle means having a vapor entrance end and a vapor exit end and each being disposed generally horizontally and extend in a generally radial direction relative to the vertical axis of the evaporator with its exit end facing said axis, feed liquid preheater means disposed generally vertically and passing uninterruptedly through at least a plurality of said remaining effects and being disposed adjacent the exit ends of the heat exchange tube means of said remaining effects for condensing the unevaporated portion of said vapor, and diaphragm wall means extending substantially horizontally between the effects to provide a liquid and vapor barrier therebetween, a vertical diaphragm wall extending diagonally across said housing, a first portion of said plurality of successive effects being disposed in vertical array on one side of said wall and a second portion of said plurality of successive effects being disposed in vertical array on the other side thereof, said effects being arranged one below the other in order of decreasing boiling pressure from top to bottom, and third portions of said plurality of effects being disposed below said first and second portions of said plurality of effects and each of said third portions of said plurality of effects occupying the entire level of said housing, each of said third portion of said plurality of effects being at a successively lower boiling pressure from top to bottom than the lowermost of said second portion of said plurality of effects, said initial effect being disposed vertically above said first and second portions of said plurality of effects.

10. The evaporator set forth in claim 9, including collecting means for collecting the unevaporated feed liquid in each effect, said feed liquid distribution means including tray means disposed above each of the heat exchange tube means of each effect and below the collecting means of the preceding effect and pipe means extending through said horizontal diaphragm means for conducting the unevaporated feed liquid from one effect to the distribution tray means of the next succeeding effect.

11. An evaporator including an initial and a plurality of effects, each effect operating at a lower temperature than preceding effects and including heat exchange tube means for placing a feed liquid and a vapor in a heat exchange relation so that a portion of said feed liquid vaporizes and at least a portion of said vapor condenses, feed liquid distribution means for feeding the unevaporated portion of the feed liquid from each effect as a film over the interior surface of the heat exchange tube means of the next succeeding effect, vapor distribution means for feeding the vaporized portion of the feed liquid generated in each effect as the vapor to the interior of the heat exchange tube means of the next succeeding lower temperature effect, said plurality of successive effects being arranged one below the other, feed liquid preheater means disposed generally vertically and passing uninterruptedly through said plurality of vertically arranged effects and being disposed for condensing that portion of said vapor not condensed in said heat exchange tube means, means for distributing an additional quantity of the liquid from said feed liquor preheater means to each of said effects in an amount substantially equal to that necessary to maintain a thin film of feed liquid on the outer surface of the heat exchange tube means of each effect, the size of said feed liquid preheater means in horizontal cross section is reduced at each succeeding higher temperature effect in relation to additional quantity of feed liquid distributed in the preceding effect.

12. The evaporator set forth in claim 11 wherein each heat exchange tube means comprises a plurality of heat exchange tube bundle means, each of said heat exchange tube bundle means of each effect having a vapor entrance end and a vapor exit end, said heat exchange tube bundle means being disposed generally horizontally and extending in a general radial direction relative to and with their exit ends adjacent said feed liquid preheater means.

13. The evaporator set forth in claim 12, wherein said plurality of successive effects are arranged one below the other in a vertical array, housing means surrounding said effects, and diaphragm wall means extending substantially horizontally between said effects to provide a liquid and vapor barrier therebetween.

14. The evaporator set forth in claim 13, wherein said housing is substantially cylindrical, a vertical diaphragm wall extending diametrically across said housing, a first portion of said plurality of successive effects being disposed in vertical array on one side of said vertical diaphragm wall and a second portion of said plurality of successive effects being disposed in vertical array on the other side thereof, said effects being arranged one below the other in order of decreasing boiling pressure from top to bottom.

15. An evaporator including a plurality of successive effects, each effect including heat exchange tube means for placing a feed liquid and a vapor in a heat exchange relation so that a portion of said feed liquid vaporizes and at least a portion of said vapor condenses, feed liquid distribution means for feeding the unevaporated portion of the feed liquid from each effect as a film over the outer surface of the heat exchange tube means of the next succeeding effect, vapor distribution means for feeding the vaporized portion of the feed liquid generated in each effect as the vapor to the heat exchange tube means of the next succeeding lower temperature effect, said effects being arranged one below the other, feed liquid preheater means disposed generally vertically and passing uninterruptedly through said plurality of vertically arranged effects and being disposed for condensing the evaporated portion of said vapor not condensed in said heat exchange tube means, said heat exchange tube means each including a plurality of heat exchange tube bundle means, each of said heat exchange tube bundle means having a vapor entrance end and a vapor exit end, said heat exchange tube bundle means being disposed generally horizontally and extending in a generally radial direction relative to and with their exit ends adjacent said feed liquid preheater means, means for distributing an additional quantity of the liquid from said feed liquid preheater means to each of said effects in an amount substantially equal to that necessary to maintain a thin film of feed liquid on the outer surface of the heat exchange tube means of each effect, the size of said feed liquid preheater means in horizontal cross section being diminished in each effect in relation to said additional quantity of feed liquid distributed in the preceding lower temperature effect, the heat exchange tube means of the initial one of said successive effects being oriented with its individual heat exchange tubes disposed substantially vertically and the heat exchange tube means of the remaining effects being oriented with their individual heat exchange tube means disposed substantially horizontally, substantially cylindrical housing means surrounding said effects, diaphragm wall means extending substantially horizontally between said effects to provide a liquid and vapor barrier therebetween, a vertical diaphragm wall extending diametrically across said housing, a first portion of said plurality of successive effects being disposed in vertical array on one side of said vertical diaphragm wall and a second portion of said plurality of successive effects being disposed in vertical array on the other side thereof, said effects being arranged one below the other in order of decreasing boiling pressure from top to bottom, and a third portion of said plurality of effects being disposed below said first and second portions of said plurality of effects and each of said third portion of said plurality occupying the entire level of said housing, each being at a successively lower boiling pressure from top to bottom than the lowermost of said second portion of said plurality of effects.

16. The evaporator set forth in claim 15, including means for collecting the unevaporated feed liquid in each effect, said feed liquid distribution means including tray means disposed above each of the heat exchange tube means of each effect and below the collecting means of the preceding effect and pipe means extending through said horizontal diaphragm means for conducting the unevaporated feed liquid from one effect to the distribution tray means of the next succeeding effect.

17. The evaporator set forth in claim 16, wherein the heat exchange tube means of said initial one of said effects is disposed vertically above said remaining effects, feed liquid preheater means extending vertically through each of said remaining effects and for conducting feed liquid to the upper end of said heat exchange tube means of said initial effect for passage downwardly along one surface thereof and means for conducting steam against the other surface thereof.

18. The evaporator of claim 17, wherein said feed liquid distribution means provides feed liquid in a relatively thin film to the outer surfaces of said horizontally disposed heat tube means and said vapor distribution means conducts said vapor to the interior thereof.

19. An evaporator including an initial and a plurality of successive effects, each effect operating at a lower temperature than preceding effects, each of said effects including a plurality of heat exchange tube bundle means for placing a feed liquid and a vapor in a heat exchange relation so that a portion of said feed liquid vaporizes and at least a portion of said vapor condenses, feed liquid distribution means for feeding the unevaporated portion of said feed liquid from each effect as a film over the exterior surfaces of the tubes of the bundle means to the heat exchange tube means of the next succeeding effect, each of said heat exchange tube bundle means of each effect having a vapor entrance end and a vapor and condensate exit end, said heat exchange tube bundle means being disposed generally horizontally and extending in a generally radial direction relative to a vertical axis with their exit ends facing said axis, vapor distribution means for feeding the vaporized portion of feed liquid in each of said plurality of successive effects except the last of said effects to the vapor entrance end of the next succeeding lower temperature effect whereby at least a portion of said vapor condenses, and condensate collecting means communicating with the exit ends of said heat exchange tube bundle means, said plurality of successive effects being arranged in a generally vertical array.

20. The evaporator of claim 19, wherein said feed liquid distribution means provides feed liquid in a relatively thin film to the outer surfaces of said horizontally disposed heat exchange tube bundle means and said vapor distribution means conducts said vapor to the interior thereof.

21. The evaporator set forth in claim 19 and including
feed liquid preheater means disposed generally vertically and passing through at least one of said plurality of successive effects and being disposed adjacent the exit ends of the heat exchange tube bundle means of said effects for condensing the unevaporated portion of said vapor, the heat exchange bundle means in each effect being arranged at substantially the same elevation.

22. The evaporator set forth in claim 19 and including means for distributing an additional quantity of the liquid from said feed liquid preheater means to each of said effects in an amount substantially sufficient to maintain a thin film of liquid on the heat exchange tube means of said additional effects, and the size of said feed water preheater means in horizontal cross section being successively smaller in each effect in relation to said additional quantity of feed liquid.

23. The evaporator set forth in claim 19, wherein said housing is substantially cylindrical,
a vertical diaphragm wall extending diagonally across said vessel, a first portion of said plurality of successive effects disposed in vertical array on one side of said wall and a second portion of said plurality of successive effects disposed in vertical array on the other side thereof, said effects being arranged one below the other in order of decreasing boiling pressure from top to bottom.

24. The evaporator set forth in claim 19 including collecting means for collecting the unevaporated feed liquid in each stage, said feed liquid distribution means including tray means disposed above each of the heat exchange tube means of each effect and below the collecting means of the preceding effect and pipe means extending through said horizontal diaphragm means for conducting the unevaporated feed liquid from one stage to the distribution tray means of the next succeeding stage.

25. The evaporator set forth in claim 19, wherein housing means surrounds said effects,
and diaphragm wall means extending substantially horizontally between said effects to provide a liquid and vapor barrier therebetween.

26. The evaporator set forth in claim 25, wherein said housing is substantially cylindrical,
a vertical diaphragm wall extending diametrically across said vessel,
a first portion of said plurality of successive effects being disposed in vertical array on one side of said wall and a second portion of said plurality of successive effects being disposed in vertical array on the other side thereof, said effects being arranged one below the other in order of decreasing boiling pressure from top to bottom.

27. The evaporator of claim 19, wherein feed liquid preheater means passes successively through said effects and is disposed adjacent the exit ends of said heat exchange tube bundle means for condensing that portion of the vapor exiting from said heat exchange tube bundle means.

28. The evaporator set forth in claim 27, wherein said plurality of successive effects are arranged one below the other,
feed liquid preheater means disposed generally vertically and passing through at least a plurality of said effects and being disposed adjacent the exit ends of the heat exchange tube bundle means of said effects for condensing said vapor exiting said portion of heat exchange tube bundle means.

29. The evaporator of claim 28 wherein said feed liquid distribution means provides feed liquid in a relatively thin film to the outer surfaces of said horizontally disposed tubes of said heat exchange tube bundle means and said vapor distribution means conducts said vapor to the interior thereof.

30. The evaporator set forth in claim 29, and including a substantially cylindrical,
a vertical diaphragm wall extending diagonally across said housing, a first portion of said plurality of successive effects being disposed in vertical array on one side of said wall and a second portion of said plurality of successive effects being disposed in vertical array on the other side thereof, said effects being arranged one below the other in order of decreasing boiling pressure from top to bottom.

31. The evaporator set forth in claim 30, including collecting means for collecting the unevaporated feed liquid in each effect, said feed liquid distribution means including tray means disposed above each of the heat exchange tube bundle means of each effect and below the collecting means of the preceding effect and pipe means extending between effects for conducting the unevaporated feed liquid from one effect to the distribution tray means of the next succeeding effect.

32. The evaporator set forth in claim 31 wherein, the heat exchange tube bundle means of the initial one of said successive effects is oriented with its individual heat exchange tubes disposed substantially vertically and the heat exchange tube bundle means of the remaining effects being oriented with their individual heat exchange tube means disposed substantially horizontally.

33. The evaporator set forth in claim 32 and including means for distributing an additional quantity of the liquid from said feed liquid preheater means to each of said effects in an amount substantially sufficient to maintain a thin film of liquid on the heat exchange tube means of said remaining effects, and the size of said feed liquid preheater means in horizontal cross section being successively smaller in each effect in relation to said quantity of feed liquid.

34. An evaporator including an initial and a plurality of successive effects,
each effect operating at successively lower temperatures and including a plurality of heat exchange tube bundle means for placing a feed liquid and a vapor in a heat exchange relation so that a portion of said feed liquid vaporizes and at least a portion of said vapor condenses,
feed liquid distribution means for feeding the unevaporated portion of said feed liquid from each effect as a film to the exterior surfaces of the heat exchange tube means of the next succeeding effect, vapor distribution means for feeding the vaporized portion of the feed liquid generated in each effect as the vapor to the interior surface of the heat exchange tube means of the next succeeding lower temperature effect,
each of said heat exchange tube bundle means of each effect having a vapor entrance end and a vapor and condensate exit end, said heat tube bundle means being disposed generally horizontally and extending in a generally radial direction relative to a vertical axis with their exit ends facing said axis,
a first portion of said plurality of successive effects being arranged one below the other in vertical array,
housing means surrounding said effects,
and diaphragm wall means extending substantially horizontally between said effects to provide a liquid and vapor barrier therebetween,
and a second portion of said plurality of effects being disposed below said first portion of said plurality of effects and each of said second portion occupying the entire level of said housing, each of said second portion of effects being at a successively lower boiling pressure from top to bottom than the lowermost of said first portion of said plurality of effects.

35. The evaporator set forth in claim 34, including means for collecting the unevaporated feed liquid in each effect, said feed liquid distribution means including tray means disposed above each of the heat exchange tubes means of each effect and below the collecting means of the preceding effect and pipe means extending through said horizontal diaphragm means for conducting the unevaporated feed liquid from one effect to the distribution tray means of the next succeeding effect.

36. An evaporator including a series of effects, each effect operating at a lower temperature than preceding effects, said effects being arranged in at least one vertical column with each effect in said column having a higher temperature than the effects disposed therebelow, each of said effects including a plurality of heat exchange tube bundle means for placing a feed liquid as a film over the exterior surfaces of the tubes of the bundle means and a vapor as a heating medium within the tubes of the bundle means in a heat exchange relation so that a portion of said feed liquid vaporizes and at least a portion of said vapor condenses, feed liquid distribution means for successively feeding the unevaporated portion of said feed liquid from each effect to the heat exchange tube bundle means of succeeding lower elevation effects whereby said feed liquid flows generally downwardly through said evaporator, each of said heat exchange tube bundle means of each effect having a vapor entrance end and a vapor and condensate exit end, said heat tube bundle means being disposed generally horizontally and extending in different, generally radial directions relative to a vertical axis with their exit ends disposed adjacent and facing said axis, vapor distribution means for feeding the vaporized portion of feed liquid in each of said plurality of successive effects except the last of said effects to the vapor entrance end of the next lower temperature effect whereby at least a portion of said vapor condenses, and condensate collecting means communicating with the exit ends of said tube bundle means.

37. In an evaporator of the type having a plurality of effects disposed in at least one vertical column with each effect operating at a higher temperature than the effects disposed below it in said column, each of said effects including a heat exchange tube bundle means for placing a feed liquid as a film over the exterior surfaces of the tubes of the bundle means and a vapor as a heating medium within the tubes of the bundle means in a heat exchange relation so that a portion of said feed liquid vaporizes and at least a portion of said vapor condenses, feed liquid distribution means for feeding by gravity and unevaporated portion of said feed liquid from each effect to the heat exchange tube bundle means of succeeding lower elevation effects, and vapor distribution means for feeding the vaporized portion of feed liquid in each of said plurality of effects except the last of said effects to the vapor entrance end of the next lower temperature effect whereby at least a portion of said vapor condenses, wherein the improvement comprises a plurality of generally horizontally arranged heat exchange tube bundles forming each heat exchange tube bundle means, each of the heat exchange tube bundles having a vapor entrance end and a vapor and condensate exit end, each of the heat exchange tube bundles of each effect being arranged at substantially the same elevation with their exit ends disposed adjacent and facing a vertical axis and each bundle extending in a generally radial direction relative to said axis whereby the heat exchange tube bundles of each effect radiate outwardly in different directions from said axis.

* * * * *

UNITED STATES PATENT OFFICE
CERTIFICATE OF CORRECTION

Patent No. 3,849,259            Dated November 19, 1974

Inventor(s) Armando B. Steinbruchel

It is certified that error appears in the above-identified patent and that said Letters Patent are hereby corrected as shown below:

Claim 11, Column 12, line 12, cancel "liquor" and substitute

--liquid--.

Claim 37, Column 18, line 19, cancel "and" and substitute --the--.

Signed and sealed this 11th day of March 1975.

(SEAL)
Attest:

RUTH C. MASON
Attesting Officer

C. MARSHALL DANN
Commissioner of Patents
and Trademarks